United States Patent [19]

Asano

[11] Patent Number: 5,365,271
[45] Date of Patent: Nov. 15, 1994

[54] INFORMATION SOURCE ENCODING APPARATUS

[75] Inventor: Kenichi Asano, Kanagawa, Japan

[73] Assignee: Mitsubitshi Denki Kabushiki Kaisha, Tokyo, Japan

[21] Appl. No.: 988,722

[22] Filed: Dec. 10, 1992

[30] Foreign Application Priority Data

Dec. 27, 1991 [JP] Japan .................. 3-347285

[51] Int. Cl.$^5$ ..................... H04N 7/133; H04N 7/137
[52] U.S. Cl. ................................ 348/402; 348/405; 348/408
[58] Field of Search ............... 358/133, 136; 348/401, 348/402, 405, 408; H04N 7/133, 7/137

[56] References Cited

U.S. PATENT DOCUMENTS

| 4,827,338 | 5/1989 | Gérard ........................... 358/136 |
| 5,038,209 | 8/1991 | Hang ............................. 358/136 |
| 5,072,295 | 12/1991 | Murakami et al. ............. 358/136 |

FOREIGN PATENT DOCUMENTS

| 0424060 | 4/1991 | European Pat. Off. ...... H04N 7/133 |
| 2238203 | 8/1990 | United Kingdom . |

OTHER PUBLICATIONS

CCITT SG XV Report R37, "Recommendation of the H-series" Aug. 1990.
Globecom 88, 31.2, pp. 998–1004, 1984 R. Plompen, et al "Motion Video Coding in CCITT SG XV The Video Source Coding".

Primary Examiner—Howard W. Britton
Attorney, Agent, or Firm—Wolf, Greenfield & Sacks

[57] ABSTRACT

An information source encoding system in which overload noise and block noise are less recognized and quantizing overload and large quantizing distortion can reduced within an intra-frame mode encoding region even when intra-frame and inter-frame mode encoding regions coexist in an image screen. An orthogonal converter outputs conversion coefficients in a predetermined spatial frequency region. A coefficient separating unit selectively separates the conversion coefficients. With the separated coefficient from the coefficient separating unit, a power is calculated. The calculated power is compared with a predetermined threshold value by a coefficient power determining unit. A step width controller sets a quantizing step width, based on the combination of a power determining ON/OFF signal the coefficient power determining unit and an adaptive control ON/OFF signal from the encoding controller, when the coefficient power is larger than the threshold value in the intra-frame mode, and sets a quantizing step width determined by the quantization characteristic designation signal from the encoding controller in remaining cases. As a result, a combined adaptive quantization characteristic signal having a quantizing step width for combined adaptive control is output to the quantizer.

6 Claims, 5 Drawing Sheets

A : COEFFICIENT BLOCK TO BE QUANTIZED IN AN INTER-FRAME MODE

B : COEFFICIENT BLOCK TO BE QUANTIZED IN AN INTRA-FRAME MODE

INFORMATION SOURCE ENCODING APPARATUS

BACKGROUND OF THE INVENTION

1. Field of the Invention

The present invention relates to an information source encoding apparatus such as a television conference/telephone signal encoding apparatus (CO-DEC).

2. Description of the Prior Art

FIG. 1 shows the structure of an information source encoding apparatus (excluding a code assigning unit) based on the International Telegraph and Telephone Consultative Committee's (CCITT) Recommendation H.261 for an encoding system for Television Conference/Telephone. In the same Figure, a subtractor 1 generates a prediction error signal 102 by subtracting the original signal 100 of a current image frame from a prediction signal 101 output from an intra-loop filter 8. An orthogonal converter 2 executes orthogonal conversion (such as discrete cosine conversion) of prediction error signal 102 from subtractor 1 through a selector 9 in an inter-frame (INTER) mode or original signal 100 in an intra-frame (INTRA) mode, respectively, in units of pixel blocks in order to generate a conversion coefficient 103. A quantizer 3 quantizes, in the inter-frame mode, all elements of respective conversion coefficients 103 from orthogonal converter 2 in the same quantizing step width, while, in the intra-frame mode, DC and AC components of conversion coefficients 103 in the same or different quantizing step. The quantized result is outputted as a quantizing index 107 (binary encoded subscript numbers for discriminating a quantization representative level value). A dequantizer 4 and an inverse orthogonal converter 5 conduct, to quantizing index 107, an inverse process of the quantization and the orthogonal conversion to recover a conversion coefficient as a decoded prediction error signal 108. An adder 6 adds the decoded prediction error signal 108 and prediction signal 101 from intra-loop filter 8 through a selector 10 to generate a local decoded signal 109. A motion compensation predicting circuit 7 executes a pattern matching calculation in units of pixel blocks to local decoded signal 109 of a preceding image frame and original signal 100 of a current image frame from adder 6 to generate prediction signal 101 and a motion vector 110 For outputting an optimum prediction. Intra-loop filter 8 executes a filtering process of prediction signal 101 from motion compensation predicting circuit 7 to suppress accumulation of encoding noise. For example, the necessity of the filtering process is judged based on the amplitude of the motion vector and an intra-loop filter ON/OFF signal 111 is outputted. Selectors 9, and 10 respectively switch between original signal 100 and prediction error signal 102 and between an idle signal and prediction signal 101 with an intra/inter-frame mode signal 114 from an encoding controller 14. Encoding controller 14 is an external structural element of the information source encoding apparatus for adaptively controlling and discriminating between the intra/inter-frame modes, and outputs intra/inter-frame mode signal 114 and an intra/inter-frame discrimination flag 115. Moreover, controller 14 also controls the quantizing step width in response to the amount of generated information so as to output a quantization characteristic designation signal to quantizer 3.

The information source encoding apparatus of the prior art explained above employs a system to control the quantizing step width only to adapt tile amount of generated information (single adaptive control system).

FIG. 2 illustrates the situation that a coefficient block B to be quantized in the intra-frame mode exists within coefficient blocks (a quantizing unit of the orthogonal conversion coefficient regions bounded with dotted lines) to be quantized in the inter-frame mode. If a small amount of information in generated (movement of image is small), quantizer 3 quantizes all elements of coefficient blocks A in a fine quantizing step width, For example, in "level 4" depending on quantization characteristic designation signal 112 from encoding controller 14. Meanwhile, all elements of coefficient block B are quantized in a coarse quantizing step width, For example, in "level 8". It is a measure against quantization overload in the quantization of coefficient block B to also apply "level 8", which is the quantizing step width of a DC component based on the Recommendation H.261 of CCITT, to an AC component. If "level 4" is also applied to the quantizing step width of an AC component, as in the case of peripheral coefficient blocks A, quantization overload is inevitably generated, easily resulting in visible overload noise if the AC component is fully extended up to the limit of dynamic range which is specified as eleven bits by Recommendation H.261 of CCITT.

In such an information source encoding apparatus of the prior art, when a region for periodical encoding (the frequency is defined as "once per 132 frames" based on Recommendation H.261 of CCITT) in the intra-frame mode a region of encoding in the inter-frame mode coexist within a comparatively stationary image screen, the intra-frame mode encoding region having the coarse quantizing step width is included in the inter-frame mode encoding region having the fine quantizing step width so that overload noise cannot easily be visualized. Accordingly, block-type noise, including discontinuity, can be visualized in a recovered image at the boundary between an intra-frame encoding region including a large quantizing distortion and a peripheral inter-frame encoding region.

SUMMARY OF THE INVENTION

The present invention provides an information source encoding apparatus employing a system for controlling quantizing step width in response not only to the amount of generated information but also to the power of the conversion coefficients so that overload noise and block-type noise are not visible even when intra/inter-frame mode encoding regions coexist within an image screen.

The information source encoding apparatus of the present invention comprises: an orthogonal converter, which is switched by an intra/inter-frame mode signal outputted by an adaptive operation of an encoding controller, for orthogonally converting, in units of pixel blocks, an original signal of a current image frame or a predicted error signal representing a difference between the original signal and a predicted signal; and a quantizer for quantizing the AC component of each conversion coefficient generated in a quantizing step width determined by a quantization characteristic designating signal from the encoding controller. An inverse process if executed to the generated quantization output data, and a pattern matching calculation in units of pixel blocks is executed by a motion compensated predicting unit to both a generated local decoding signal and the original signal of the current image frame to generate a predicted signal. This apparatus is characterized by comprising the following means to perform combined adaptive control:

a coefficient separating unit for selectively separating conversion coefficients in a predetermined spatial frequency region from the orthogonal converter;

a coefficient power determining unit for calculating the power of conversion coefficients selected by the coefficient separating unit so as to compare the calculated power with a predetermined threshold value; and a step-width controller for causing the quantizer to operate on the basis of the result of discriminating between an intra-frame mode and an inter-frame mode and the decided result from the coefficient power determining unit in a quantizing step width which does not generate any quantization overload if the power of the conversion coefficients is larger than the threshold value in the intra-frame mode, or in a quantizing step width determined by the quantization characteristic designation signal from the encoding controller in remaining cases, and for outputting a combined adaptive quantization characteristic designation signal to the quantizer so as to adaptively control the quantizing step width in a combined manner.

In the information source encoding apparatus of the present invention, the orthogonal converter orthogonally converts, when the encoding regions of the intra-frame and inter-frame modes coexist within an image screen, the original signal of tile image frame or a predicted error signal indicative of a difference between the original signal and a predicted signal fed from the motion compensated predicting unit. The quantizer, then quantizes each conversion coefficient generated depending on the quantizing step width determined by the combined adaptive quantization characteristic designation signal from the step-width controller. This step-width controller causes the quantizer to operate in tile quantizing step width which does not generate any quantization overload in the intra-frame mode when the power of the conversion coefficients in a spatial frequency region is larger than the predetermined threshold value, or in the quantizing step determined by the quantization characteristic designation signal from the encoding controller in remaining cases. This results in the generation of combined adaptive quantization characteristic designation signal in the quantizing step width for combined adaptive control.

DETAILED DESCRIPTION OF THE PREFERRED EMBODIMENTS

Figure 1:
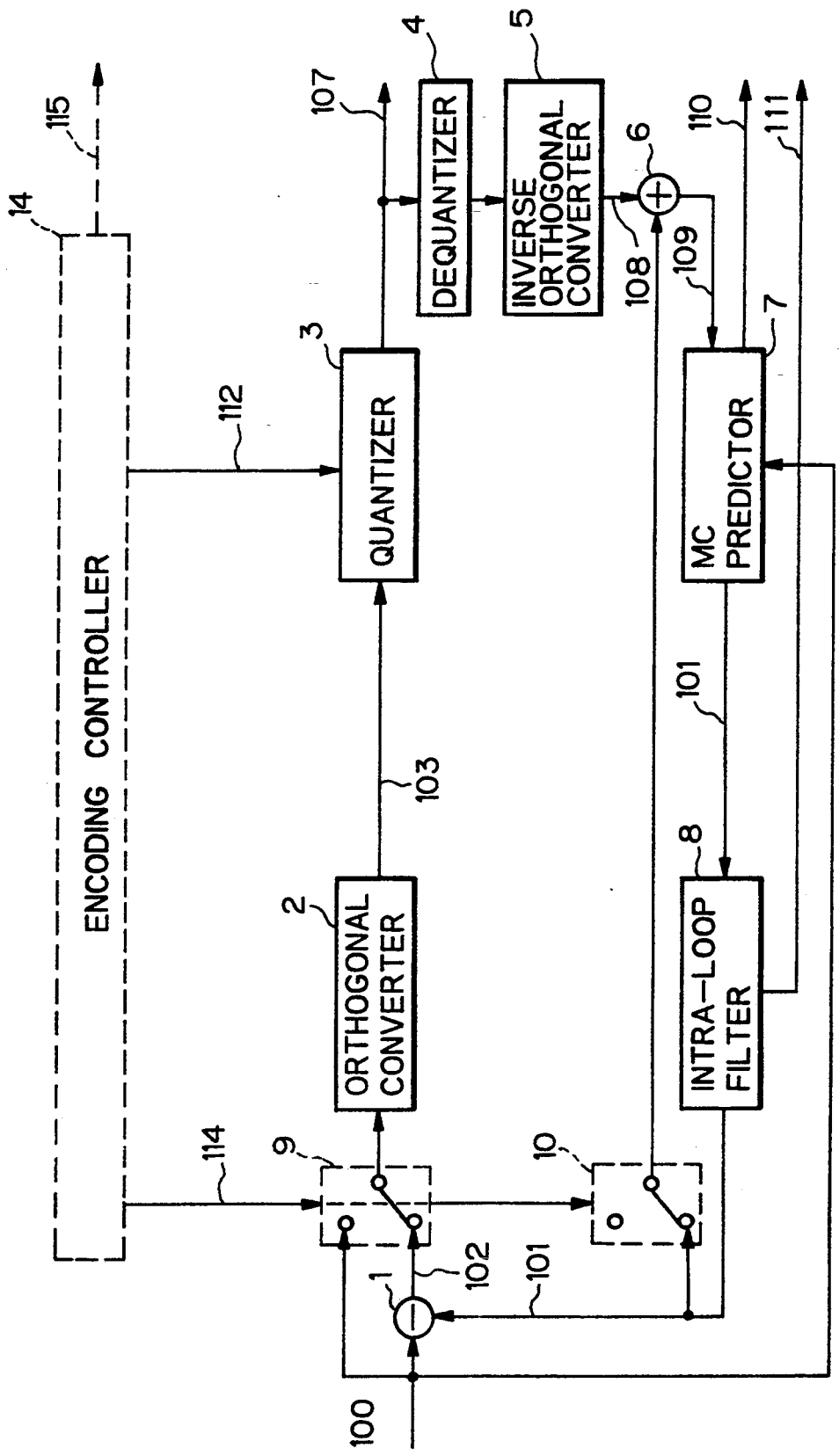
FIG. 1 is a block diagram of an information source encoding apparatus of the prior art (excluding a code assigning unit)
Figure 2:
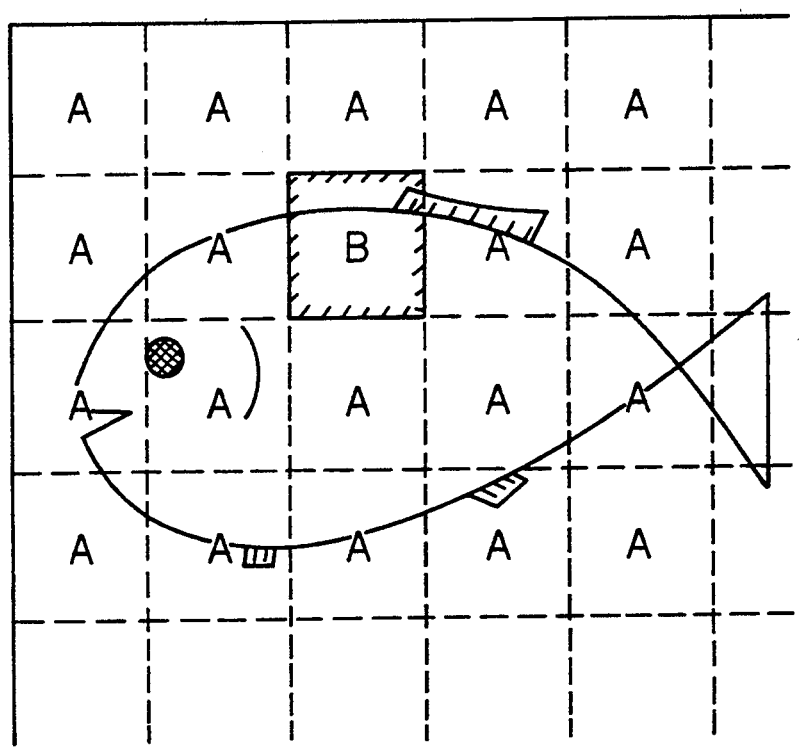
FIG. 2 shows an image frame for explaining the condition when coefficient blocks to be quantized in intra-frame/inter-frame modes, taken by a quantizer shown in FIG. 1, coexist.
Figure 3:
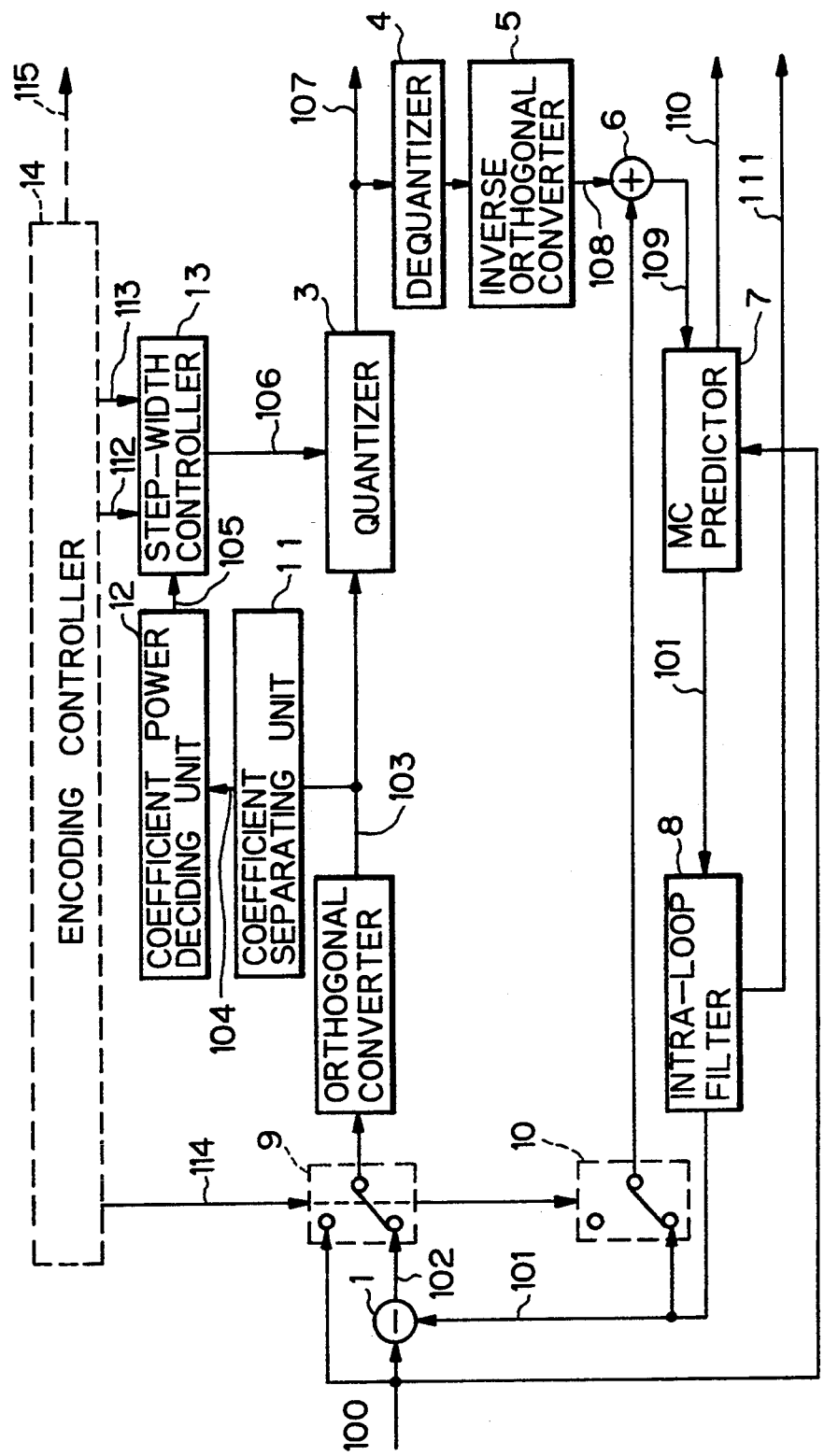
FIG. 3 shows a block diagram of an embodiment of an information source encoding apparatus of the present invention (excluding a code assigning unit)

FIG. 3 shows the structure of an embodiment of an information source encoding apparatus (excluding the code assigning unit) of the present invention. In this figure, elements similar to those in FIG. 1 are designated by like reference numerals and the explanation thereof is omitted here. Encoding controller 14 further outputs an adaptive control ON/OFF signal 113. Namely, signal 113 turns ON when the AC component of each conversion coefficient is quantized by quantizer 3 in the intra-frame mode or turns OFF when quantized in the inter-frame mode. A coefficient separating unit 11 selectively separates only a predetermined space frequency component from conversion coefficient 103 fed from orthogonal converter 2 and separation coefficients 104 (for example, $T_{10}$, $T_{20}$, $T_{01}$, $T_{11}$ and $T_{02}$). A coefficient power deciding circuit 12 calculates the power P of separation coefficients 104 from coefficient separating unit 11 as a square sum (for example, $P = T_{10}^2 + T_{20}^2 + T_{01}^2 + T_{11}^2 + T_{02}^2$), compares it with a predetermined threshold value $T_h$ and causes power determining ON/OFF signal 105 to turn ON when $P > T_h$ or turn OFF when $P \leq T_h$. A step-width controller 13 deals with quantization characteristic designation signal 112 from encoding controller 14 in a predetermined manner based a combination of power determining ON/OFF signal 105 fed from coefficient power deciding unit 12 and adaptive control ON/OFF signal 113 fed from encoding controller 14, and outputs a combined adaptive quantization characteristic designation signal 106 to quantizer 3.

As described previously, the information source encoding apparatus of the present invention employs a system (combined adaptive control system) responsive not only the amount of generated information, but also to the polymer of conversion coefficients, for controlling the quantizing step width.

Figure 4:
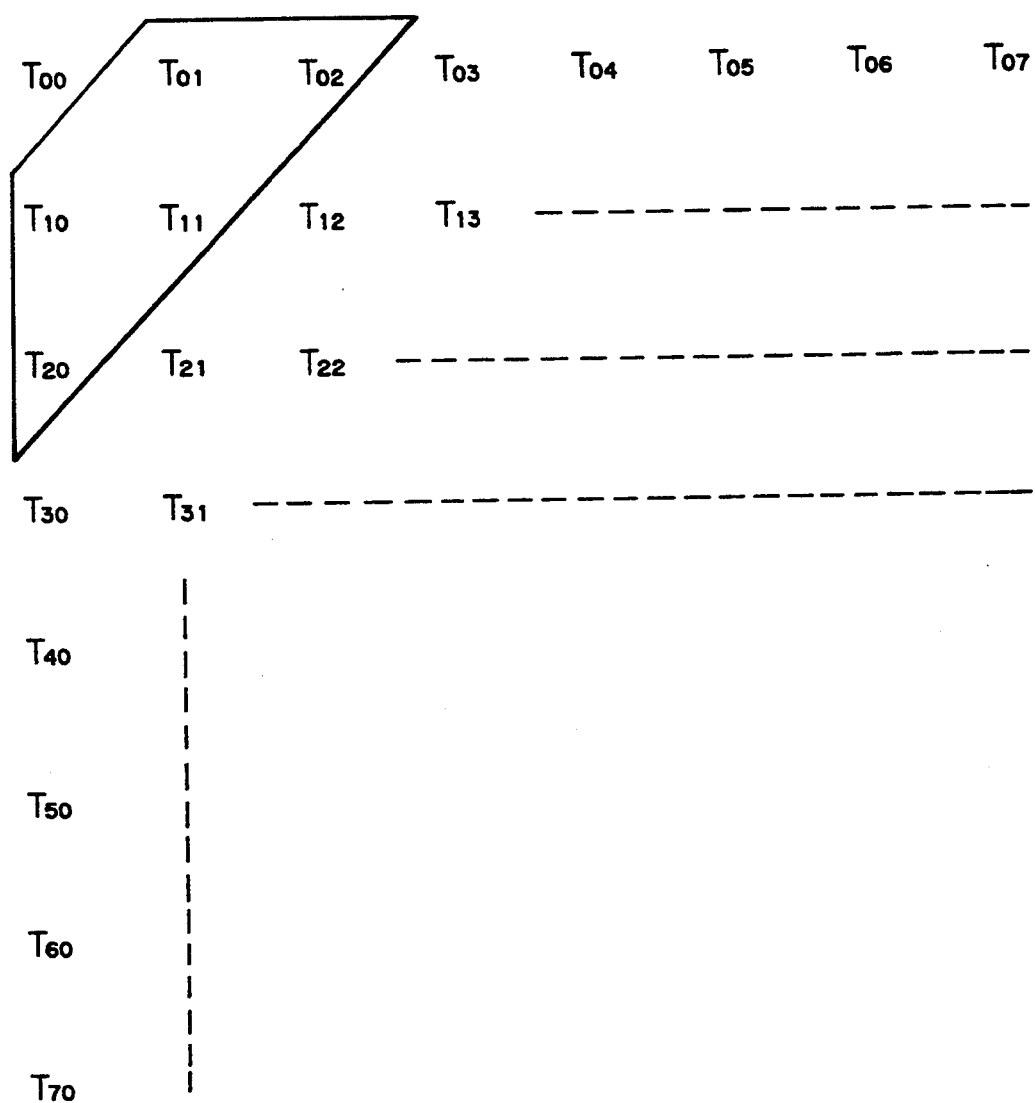
FIG. 4 shows a diagram of 8×8 coefficient blocks for explaining a conversion coefficient selectively separated by a coefficient separating unit shown in FIG. 8.

FIG. 4 shows conversion coefficients $T_{ij}$ (i, j = 0, 1, ..., 7) of an 8×8 coefficient block (specified by Recommendation H.261 of CCITT), obtained by executing a discrete cosine conversion (DCT) to an 8×8 pixel block. $T_{00}$ indicates a DC component and $T_{ij}$ indicates higher vertical and horizontal frequency components if i and j have larger values. Coefficient separation unit 11 selectively separates only the conversion coefficients in a predetermined spatial frequency region (for example, the region enclosed by a solid line containing $T_{10}$, $T_{20}$, $T_{01}$, $T_{11}$ and $T_{02}$) and then outputs such conversion coefficients as separated coefficients 104.

Figures 5, 6:
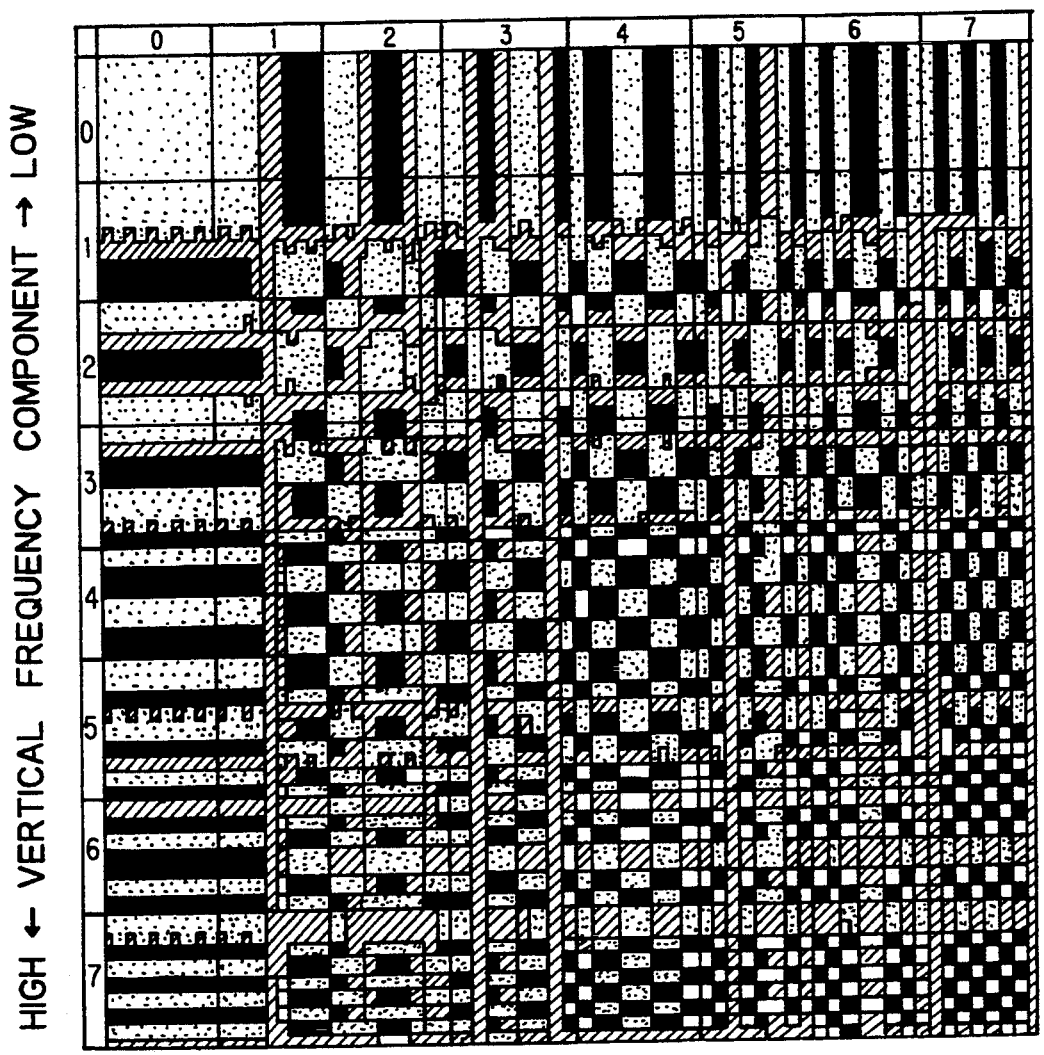
FIG. 5 is an 8×8 basic pattern diagram for explaining a spatial frequency region predetermined by the coefficient separating unit shown in FIG. 3.
FIG. 6 is used to explain combinations for adaptive control performed by a step-width control unit shown in FIG. 3.

As shown in FIG. 5, the spatial frequency region determined by coefficient separating unit 11 includes regions such as $T_{10}$, $T_{20}$, $T_{01}$, $T_{11}$ and $T_{02}$ containing thick and thin wide areas (low spatial frequency components) among the basic patterns of respective conversion coefficients $T_{ij}$ obtained by executing a discrete cosine conversion of the 8×8 pixel block (the 8×8 pixel block is obtained by multiplying 64 patterns with $T_{ij}$ and then adding all patterns). When the conversion coefficient value of this region is large, it can easily be visually recognized on a screen. When a quantizing overload is generated in this region, deterioration in image quality may be recognized.

Step width controller 13 outputs combined adaptive quantization characteristic designation signal 106 to quantizer 3 either using the value of quantization characteristic designation signal 112 fed from encoding controller 14 or the value of quantizing step width "level 8", depending on any combination of power determining ON/OFF signal 105 and adaptive control ON/OFF signal 113. Since encoding controller 14 outputs ON or OFF state of adaptive control ON/OFF signal 113 depending on whether quantizer 3 quantizes the AC component of the conversion coefficients in the intra-frame or inter-frame mode, quantizer 3 uses the value of quantizing step width "level 8" only if the power of the selected conversion coefficients is larger than the threshold value in the intra-frame mode and uses, in remaining cases, the quantizing step width determined by quantization characteristic designation signal 112 from encoding controller 14 which realizes adaptive control depending on the amount of generated information.

In above embodiment, coefficient power deciding unit 12 uses a square sum of the coefficients as power P of separation coefficients 104, but it may use a maximum value of the coefficients (for example, P=MAX ($T_{10}$, $T_{20}$, $T_{01}$, $T_{11}$, $T_{02}$)) in place of such square sum.

As described above, the information source encoding apparatus of the present invention employs a combined adaptive control system for controlling quantizing step width in response not only to the amount of generated information but also to the power of the conversion coefficients and, therefore, can avoid any excessive quantizing overload or large quantizing distortion within an intra-frame mode encoding region, resulting in difficulty in recognizing any overload noise or block noise, even when encoding regions of the intra-frame and inter-frame modes coexist in a screen, in comparison with a conventional single adaptive control system which responds only to amount of generated information.

What is claimed is:

1. An information source encoding apparatus comprising:
    an orthogonal converter which is switched by an intra-frame/inter-frame mode signal outputted by an adaptive discrimination operation of an encoding controller for generating conversion coefficients by orthogonal conversion in units of pixel blocks of an original signal of a current image frame or a predicted error signal indicative of a difference between the original signal and the predicted signal;
    a quantizer which generates quantization output data by quantizing the AC component of each conversion coefficient supplied from said orthogonal converter in a quantizing step width determined by quantization characteristic designating signal from said encoding controller; and
    a motion compensated predicting unit which generates the predicted signal by applying a pattern matching operation in units of pixel blocks to a local decoding signal of a preceding image frame generated by conducting an inverse process on the quantization output data and the original signal of the current image frame;
    said encoding apparatus further comprising a coefficient separating unit for selectively separating conversion coefficients in a predetermined spatial frequency region from said orthogonal converter;
    a coefficient power deciding unit for calculating to power of the conversion coefficients selected by said coefficient separating unit so as to compare the calculated result with a predetermined threshold value; and
    a step-width controller for causing said quantizer to operate, based on the result of the discriminating between an intra-frame mode and an inter-frame mode by said encoding controller and the result from said power deciding unit, in a quantizing step width which does not generate any quantization overload if the power of said conversion coefficients is larger than said threshold value in the intra-frame mode, or in a quantizing step determined by the quantizing characteristic designation signal from said encoding controller in remaining cases, and for outputting a combined adaptive quantizing characteristic designation signal to said quantizer to adaptively control the quantizing step width in a combined manner.

2. An apparatus for encoding an image frame comprising:
    a motion compensated predicting unit for generating a predicted signal based on a preceding image frame;
    an orthogonal converter for receiving one of an original signal of a current image frame and a predicted error signal indicating a difference between the original signal and the predicted signal, and for generating conversion coefficients;
    an encoding controller for providing a quantization characteristic designating signal and an adaptive control signal based on whether an original signal or a predicted error signal is to be received by the orthogonal converter;
    a quantizer for quantizing the AC component of each conversion coefficient from said orthogonal converter in a step width;
    means for receiving the conversion coefficients from the orthogonal converter, and for selecting conversion coefficients in a predetermined spatial frequency region;
    means for calculating the power of the conversion coefficients selected by the coefficient separating unit, for comparing the calculated result with a threshold value, and for providing a power determining signal; and
    a step-width controller, responsive to the power determining signal, the adaptive control signal, and the quantizing characteristic designation signal, for providing a combined adaptive quantizing characteristic designation signal to said quantizer to adaptively control the quantizing step width.

3. The apparatus of claim 2, wherein the step-width controller includes:
    means for providing to the quantizer the combined adaptive quantizing characteristic designation signal which does not generate quantization overload if the power of said conversion coefficients exceeds the threshold value; and
    means for providing to the quantizer the combined adaptive quantizing characteristic designation signal which is derived from the quantizing characteristic designation signal from said encoding controller if the power does not exceed the threshold value.

4. The apparatus of claim 2, wherein the calculating means generates a sum of squares of selected coefficients.

5. The apparatus of claim 2, wherein the orthogonal converter is switched by an intra-frame/inter-frame mode signal from the encoding controller, wherein the adaptive signal is set to a first value in the case of the inter-frame mode and to a second value in case of intra-frame mode, wherein the combined adaptive quantizing characteristic designation signal provided to the quantizer is the same as the quantizing characteristic designation signal from said encoding controller if the adaptive signal has the first value.

6. A method for encoding a signal in a system having an orthogonal converter for receiving one of an original signal of a current image frame and a predicted error signal and for providing conversion coefficients to a quantizer which quantizes the AC component of each conversion coefficient from said orthogonal converter in a step width, the method comprising the steps of:

selecting conversion coefficients from among the conversion coefficients provided by the orthogonal converter;

deriving a power level in response to the selected conversion coefficients;

comparing the power level to a threshold; and providing an adaptive quantizing signal to said quantizer for adaptively controlling the quantizing step width, in response to the comparing step and in response to whether an original signal or a predicted error signal is received by the orthogonal converter.

* * * * *